United States Patent
Uno

(10) Patent No.: US 8,891,255 B2
(45) Date of Patent: Nov. 18, 2014

(54) SWITCHING POWER SUPPLY APPARATUS INCLUDING SIMULTANOUS CONTROL OF MULTIPLE OUTPUTS

(75) Inventor: Yoshiyuki Uno, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 17 days.

(21) Appl. No.: 13/591,254

(22) Filed: Aug. 22, 2012

(65) Prior Publication Data

US 2012/0313433 A1    Dec. 13, 2012

Related U.S. Application Data

(63) Continuation of application No. PCT/JP2011/054087, filed on Feb. 24, 2011.

(30) Foreign Application Priority Data

Mar. 16, 2010   (JP) .................................. 2010-059484
Jun. 7, 2010   (JP) .................................. 2010-129590

(51) Int. Cl.
   *H02M 3/335*   (2006.01)
   *H02M 3/24*    (2006.01)
   *H02M 7/217*   (2006.01)
   *H02M 1/00*    (2006.01)
   *H02M 3/337*   (2006.01)

(52) U.S. Cl.
   CPC ........ *H02M 3/33561* (2013.01); *Y02B 70/1433* (2013.01); *Y02B 70/1441* (2013.01); *H02M 2001/0058* (2013.01); *H02M 3/337* (2013.01)
   USPC .............................. 363/21.02; 363/97; 363/127

(58) Field of Classification Search
   USPC .............. 363/16, 17, 19, 21.01–21.02, 21.07, 363/127, 95–98
   See application file for complete search history.

(56) References Cited

U.S. PATENT DOCUMENTS 5,448,465 A * 9/1995 Yoshida et al. ................. 363/15
7,629,781 B2 * 12/2009 Kyono .......................... 323/267

(Continued)

FOREIGN PATENT DOCUMENTS

CN    101278468 A    10/2008
CN    101622776 A    1/2010

(Continued)

OTHER PUBLICATIONS

Official Communication issued in International Patent Application No. PCT/JP2011/054087, mailed on Apr. 12, 2011.

(Continued)

*Primary Examiner* — Timothy J Dole
*Assistant Examiner* — Yusef Ahmed
(74) *Attorney, Agent, or Firm* — Keating & Bennett, LLP

(57) ABSTRACT

In a switching power supply apparatus, a resonant capacitor and an inductor are connected in series between a primary winding in a transformer and a second switching element. A first rectifier smoothing circuit including a diode and a capacitor rectifies and smoothes a voltage occurring at a first secondary winding in the transformer during an on period of a first switching element to extract a first output voltage. A second rectifier smoothing circuit including a diode and a capacitor rectifies and smoothes a voltage occurring at a second secondary winding in the transformer during an on period of the second switching element to extract a second output voltage. A control circuit controls an on time of the first switching element and an on time of the second switching element on the basis of the first output voltage and the second output voltage.

14 Claims, 10 Drawing Sheets

(56) References Cited

U.S. PATENT DOCUMENTS

| | | | |
|---|---|---|---|
| 8,040,696 B2* | 10/2011 | Wu et al. | 363/21.02 |
| 8,189,355 B2* | 5/2012 | Kyono | 363/70 |
| 8,542,501 B2* | 9/2013 | Kyono | 363/21.02 |
| 2001/0036087 A1* | 11/2001 | Raets et al. | 363/17 |
| 2002/0186026 A1* | 12/2002 | Elferich | 324/652 |
| 2004/0170030 A1* | 9/2004 | Duerbaum et al. | 363/16 |
| 2005/0068792 A1* | 3/2005 | Yasumura | 363/21.06 |
| 2009/0201700 A1* | 8/2009 | Aso et al. | 363/17 |
| 2009/0256423 A1* | 10/2009 | Kyono | 307/31 |
| 2010/0046251 A1* | 2/2010 | Kyono | 363/21.02 |
| 2010/0172159 A1* | 7/2010 | Kyono | 363/21.17 |

FOREIGN PATENT DOCUMENTS

| | | |
|---|---|---|
| JP | 04-121181 U | 10/1992 |
| JP | 06-303771 A | 10/1994 |
| JP | 2001-320879 A | 11/2001 |
| JP | 2003-018838 A | 1/2003 |
| JP | 2007-040227 A | 2/2007 |
| JP | 2008-219978 A | 9/2008 |

OTHER PUBLICATIONS

Official Communication issued in corresponding Chinese Patent Application No. 201180014080.0, mailed on May 5, 2014.

* cited by examiner

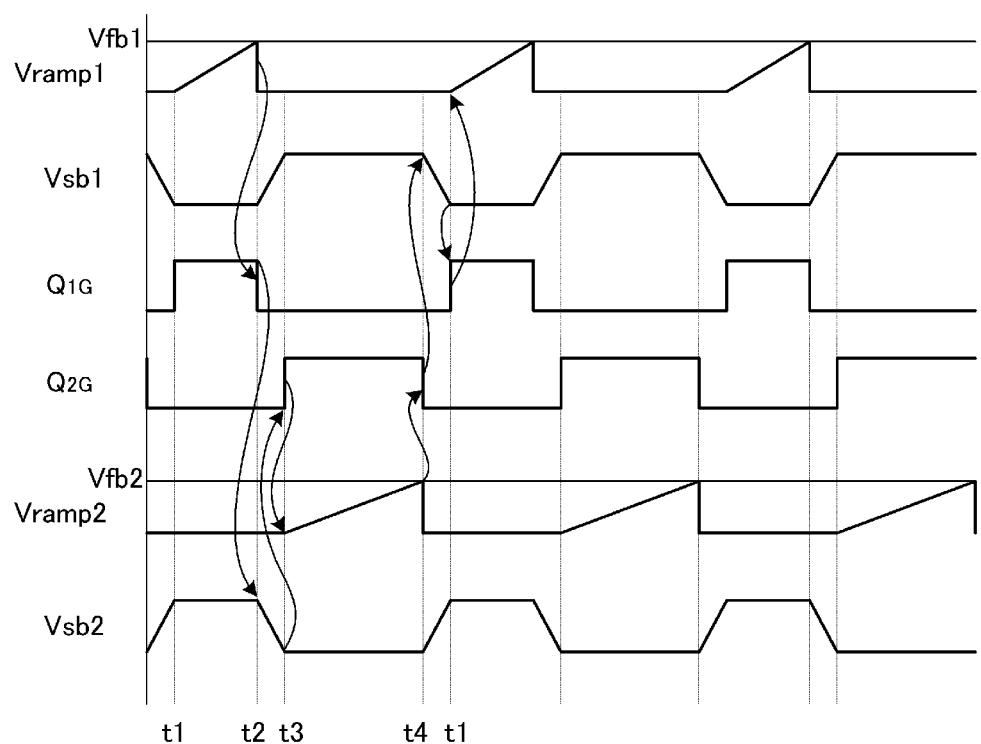

SWITCHING POWER SUPPLY APPARATUS INCLUDING SIMULTANOUS CONTROL OF MULTIPLE OUTPUTS

BACKGROUND OF THE INVENTION

1. Field of the Invention

The present invention relates to a switching power supply apparatus including multiple outputs and, more particularly, to a switching power supply apparatus capable of simultaneously controlling two outputs with high accuracy.

2. Description of the Related Art

Switching power supply apparatuses including multiple outputs are disclosed in, for example, Japanese Unexamined Utility Model Registration Application Publication No. 4-121181 and Japanese Unexamined Patent Application Publication No. 6-303771.

Japanese Unexamined Utility Model Registration Application Publication No. 4-121181 discloses a power supply circuit including two secondary windings in a transformer. In the power supply circuit disclosed in Japanese Unexamined Utility Model Registration Application Publication No. 4-121181, a rectifier smoothing circuit is provided for each of the secondary windings and the output voltage from one of the secondary windings is detected to perform feedback control.

Japanese Unexamined Patent Application Publication No. 6-303771 discloses a switching power supply circuit configured to have a current resonant converter. The switching power supply circuit disclosed in Japanese Unexamined Patent Application Publication No. 6-303771 is shown in FIG. 1. The switching power supply circuit is a current resonance type switching regulator including switching elements S1 and S2, a converter transformer 3, and a control circuit 2 controlling the switching elements S1 and S2. The converter transformer 3 includes a primary winding NP to which an input voltage is applied in synchronization with an on or off operation of the switching elements S1 and S2, a control voltage secondary winding NS2 for supplying an operating voltage VCC to the control circuit 2, and an output voltage secondary winding NS1 for extracting a direct current (DC) output V0. A full-wave rectifier circuit is provided at a secondary side of each of the output voltage secondary winding NS1 and the control voltage secondary winding NS2. The control circuit 2 complementarily drives the switching elements S1 and S2 at a duty ratio of 50% to control the output voltage Vo by frequency control.

Both of the power supply circuits disclosed Japanese Unexamined Utility Model Registration Application Publication No. 4-121181 and Japanese Unexamined Patent Application Publication No. 6-303771 are controlled so that the voltage of a rectifier smoothing output (at a control output side) of either of the two secondary windings in the transformer is stabilized. However, the output voltage is not determined only by a turn ratio of the windings in the transformer due to the effect of, for example, the degree of coupling of the transformer, resistance components, a forward drop voltage of a diode, and a surge caused by switching and the output voltage is varied with the magnitude of a load and/or a change or variation in characteristics of the elements at a non-control output side. In other words, there is a problem in that the accuracy of the voltage stabilization is low at the non-control output side.

SUMMARY OF THE INVENTION

Accordingly, preferred embodiments of the present invention provide a switching power supply apparatus capable of simultaneously controlling two outputs with high accuracy.

A switching power supply apparatus according to a preferred embodiment of the present invention includes a series circuit that is connected to a power receiving unit into which a direct current input voltage is input and that includes a first switching element and a second switching element; a transformer in which at least a primary winding and a secondary winding are magnetically coupled to each other; a series resonant circuit connected in parallel to the first switching element or the second switching element, in which the primary winding in the transformer, an inductor, and a capacitor are connected in series to each other; a first rectifier smoothing circuit that rectifies and smoothes a voltage occurring at the secondary winding in the transformer during an on period of the first switching element to extract a first output voltage; a second rectifier smoothing circuit that rectifies and smoothes a voltage occurring at the secondary winding in the transformer during an on period of the second switching element to extract a second output voltage; and a switching control circuit that drives the first switching element and the second switching element so that the first switching element and the second switching element complementarily repeat turning on-off, controls an on time of the first switching element and an on time of the second switching element on the basis of the first output voltage and the second output voltage, respectively, and controls the first output voltage and the second output voltage.

A switching power supply apparatus according to a preferred embodiment of the present invention includes a first series circuit which is connected to a power receiving unit into which a direct current input voltage is input and in which a first switching element is at a high side and a second switching element is at a low side; a second series circuit which is connected to the power receiving unit into which the direct current input voltage is input and in which a third switching element is at the high side and a fourth switching element is at the low side; a transformer in which at least a primary winding and a secondary winding are magnetically coupled to each other; a series resonant circuit one end of which is connected to a connection point between the first switching element and the second switching element and the other end of which is connected to a connection point between the third switching element and the fourth switching element, the series resonant circuit including the primary winding in the transformer, an inductor, and a capacitor; a first rectifier smoothing circuit that rectifies and smoothes a voltage occurring at the secondary winding in the transformer during an on period of the first switching element and the fourth switching element to extract a first output voltage; a second rectifier smoothing circuit that rectifies and smoothes a voltage occurring at the secondary winding in the transformer during an on period of the second switching element and the third switching element to extract a second output voltage; and a switching control circuit that drives the first switching element, the second switching element, the third switching element, and the fourth switching element so that the first and fourth switching elements and the second and third switching elements complementarily repeat turning on-off, controls an on time of the first switching element and the fourth switching element and an on time of the second switching element and the third switching element on the basis of the first output voltage and the second output voltage, respectively, and controls the first output voltage and the second output voltage.

A switching power supply apparatus according to a preferred embodiment of the present invention includes a first output voltage detection circuit that detects the first output voltage and a second output voltage detection circuit that detects the second output voltage.

The switching control circuit preferably performs multivariable feedback control to the on time $T_{on1}$ of the first switching element and the on time $T_{on2}$ of the second switching element so that the first output voltage Vo1 and the second output voltage Vo2 are equal to certain voltage values on the basis of a detection signal by the first output voltage detection circuit and a detection signal by the second output voltage detection circuit in the following relationship:

Formula 5

$$L\left[\begin{pmatrix} T_{on1} \\ T_{on2} \end{pmatrix}\right] = \begin{pmatrix} A & B \\ C & D \end{pmatrix} L\left[\begin{pmatrix} V_{ref1} - V_{o1} \\ V_{ref2} - V_{o2} \end{pmatrix}\right] \quad (5)$$

In Formula 5, A, B, C, and D denote transfer functions and L[] denotes a Laplace transform, wherein $V_{o1}$ denotes the first output voltage, $V_{o2}$ denotes the second output voltage, $T_{on1}$ denotes the on time of the first switching element, $T_{on2}$ denotes the on time of the second switching element, $V_{ref1}$ denotes a first reference voltage, and $V_{ref2}$ denotes a second reference voltage.

The transfer functions A and D are set to zero. In other words, the second output voltage Vo2 is controlled in the on time of the first switching element and the first output voltage Vo1 is controlled in the on time of the second switching element.

The secondary winding may preferably include a single winding that generates the first output voltage and the second output voltage.

The secondary winding may preferably include a first secondary winding that generates the first output voltage and a second secondary winding that generates the second output voltage.

The first secondary winding and the second secondary winding preferably are separately wound and a ground side of the first rectifier smoothing circuit is connected to the ground side of the second rectifier smoothing circuit.

The first secondary winding and the second secondary winding preferably are separately wound and a ground side of the first rectifier smoothing circuit is connected to a voltage output side of the second rectifier smoothing circuit or the ground side of the second rectifier smoothing circuit is connected to the voltage output side of the first rectifier smoothing circuit.

With the above configuration, it is possible to achieve balance between the two outputs well.

The switching control circuit preferably includes, for example, a digital signal processor (DSP).

According to a preferred embodiment of the present invention, it is possible to keep the accuracy of the voltages of two outputs at high level in response to variation in magnitude of loads connected to the two outputs.

In addition, controlling the second output voltage Vo2 in the on time of the first switching element and controlling the first output voltage Vo1 in the on time of the second switching element allow the control circuit to be simply configured.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a waveform diagram of signals output from the components in the circuit shown in FIG. 7.

DETAILED DESCRIPTION OF THE PREFERRED EMBODIMENTS

First Preferred Embodiment

A switching power supply apparatus according to a first preferred embodiment will now be described with reference to FIG. 2 and FIG. 3.

Figure 1:
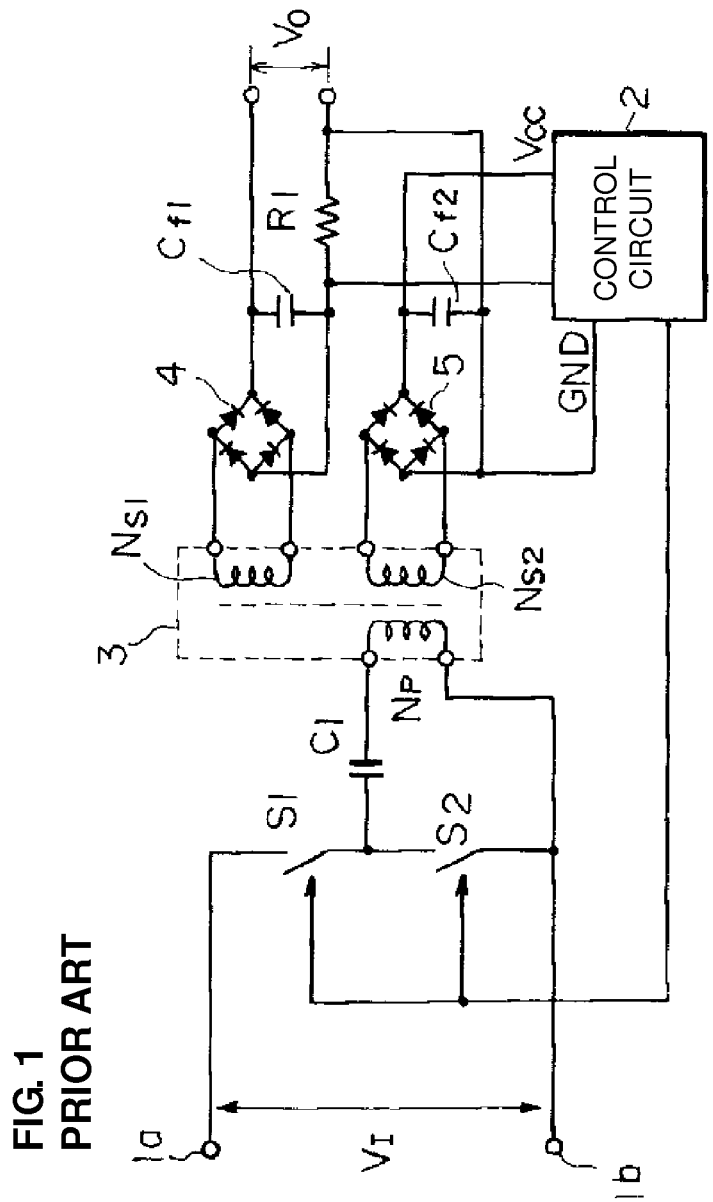
FIG. 1 is a circuit diagram of a switching power supply circuit disclosed in Japanese Unexamined Patent Application Publication No. 6-303771.
Figure 2:
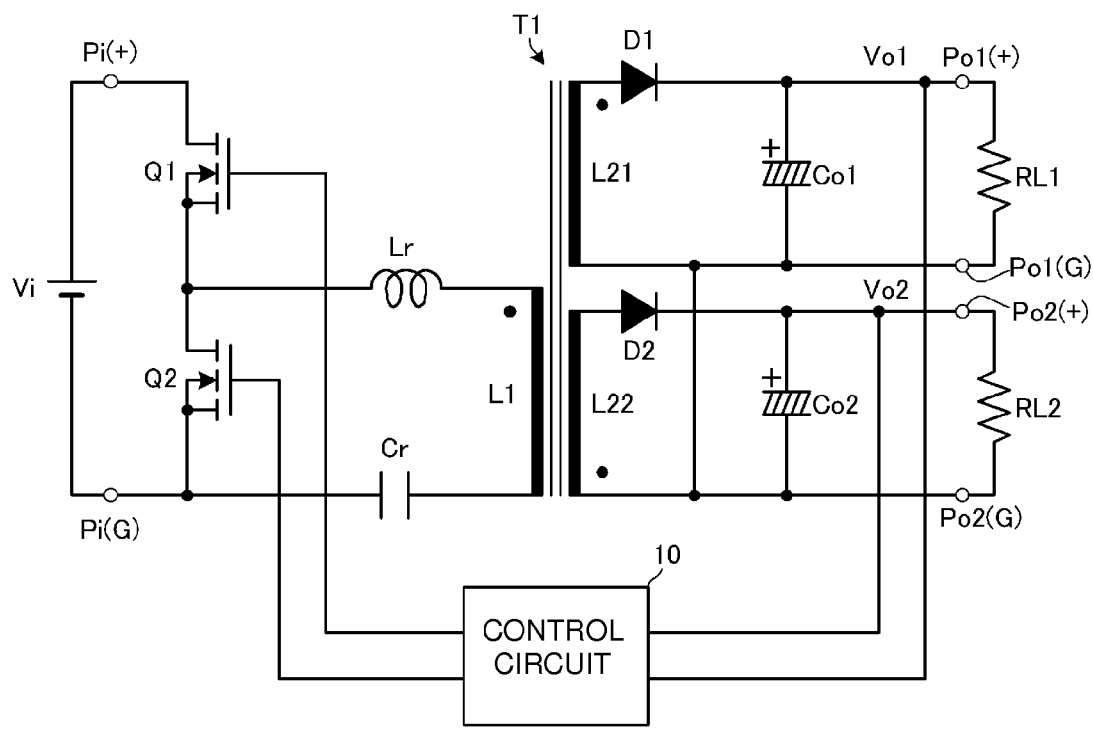
FIG. 2 is a circuit diagram of a switching power supply apparatus 101 according to a first preferred embodiment of the present invention.

FIG. 2 is a circuit diagram of a switching power supply apparatus 101 according to the first preferred embodiment. The switching power supply apparatus 101 includes a transformer T1 in which at least a primary winding L1, a first secondary winding L21, and a second secondary winding L22 are magnetically coupled to each other. A first switching element Q1 and a second switching element Q2 are connected in series to power input terminals Pi(+) and Pi(G), which serves as a power receiving unit into which a DC input voltage Vi is input. A resonant capacitor Cr and an inductor Lr defining a series resonant circuit with the primary winding L1 are provided between the primary winding L1 in the transformer T1 and the second switching element Q2. The resonant capacitor Cr and the inductor Lr are connected in series to the primary winding L1 in the transformer T1 and the second switching element Q2. The inductor Lr may be combined with the transformer T1, instead of being provided as a separate component.

A first rectifier smoothing circuit including a diode D1 and a capacitor Co1 is provided for the first secondary winding L21 in the transformer T1. The first rectifier smoothing circuit rectifies and smoothes a voltage occurring at the first secondary winding L21 in the transformer T1 during an on period of the first switching element Q1 to extract a first output voltage Vo1.

Similarly, a second rectifier smoothing circuit including a diode D2 and a capacitor Co2 is provided for the second secondary winding L22 in the transformer T1. The second rectifier smoothing circuit rectifies and smoothes a voltage occurring at the second secondary winding L22 in the transformer T1 during an on period of the second switching element Q2 to extract a second output voltage Vo2.

The first secondary winding L21 and the second secondary winding L22 are separately wound, and a ground side of the first rectifier smoothing circuit is connected to the ground side of the second rectifier smoothing circuit.

The first output voltage Vo1 is supplied to first power output terminals Po1(+) and Po1(G) to be applied to a load RL1. The second output voltage Vo2 is supplied to second power output terminals Po2(+) and Po2(G) to be applied to a load RL2.

Each of the first switching element Q1 and the second switching element Q2 preferably is a metal oxide semiconductor field effect transistor (MOSFET) and a switching control circuit (hereinafter simply referred to as a "control circuit") 10 is connected to the gates of the first switching element Q1 and the second switching element Q2. The control circuit 10 drives the first switching element Q1 and the second switching element Q2 so that the first switching element Q1 and the second switching element Q2 complementarily repeat turning on-off with a time during which both the first switching element Q1 and the second switching element Q2 are in an off state being sandwiched between the turning on-off operations. In addition, the control circuit 10 controls an on time of the first switching element Q1 and an on time of the second switching element Q2 on the basis of the first output voltage Vo1 and the second output voltage Vo2, respectively. In other words, the on duty ratio is varied, unlike current resonant converters in related art. The variation in the on duty ratio causes each of the first output voltage Vo1 and the second output voltage Vo2 to be stabilized at a certain voltage.

Figure 3A:
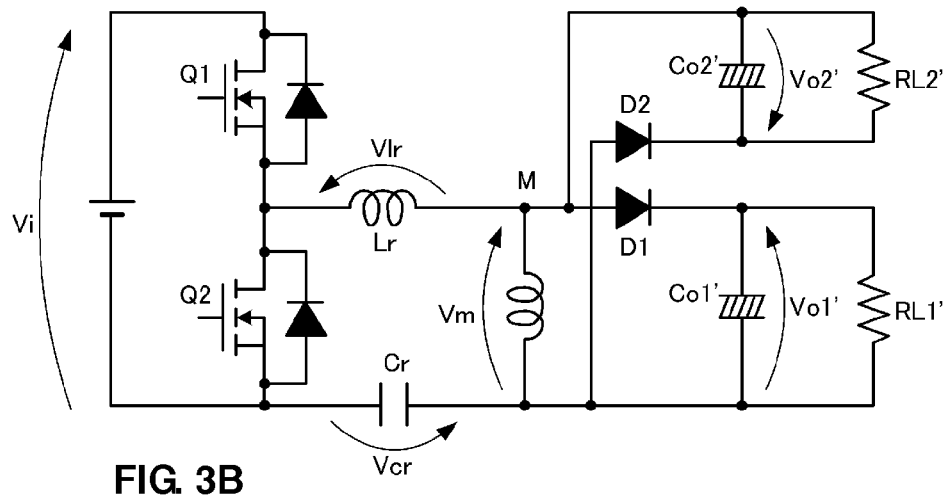
FIG. 3A is an equivalent circuit diagram of the entire switching power supply apparatus 101 shown in FIG. 2.
Figure 3B:
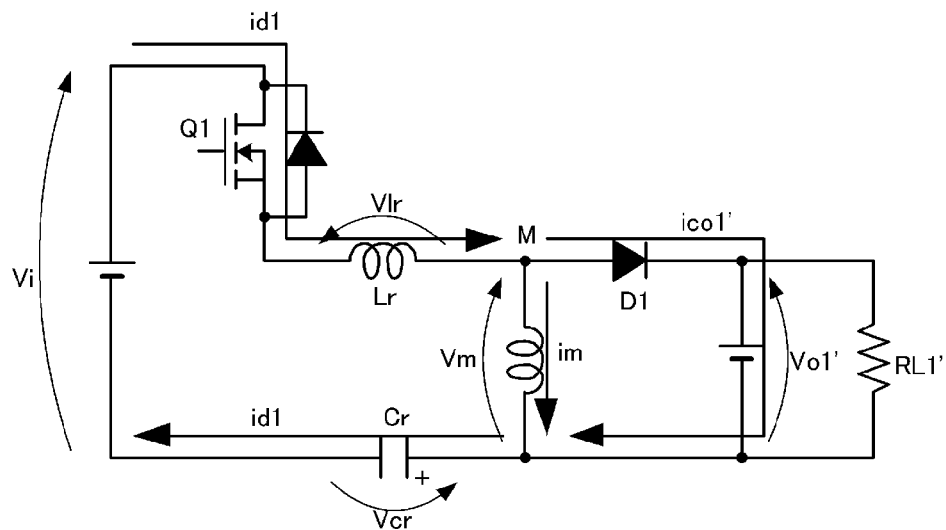
FIG. 3B is an equivalent circuit diagram when a first switching element Q1 is in an on state.

FIG. 3A is an equivalent circuit diagram of the entire switching power supply apparatus 101 shown in FIG. 2. FIG. 3B is an equivalent circuit diagram when the first switching element Q1 is in an on state and FIG. 3C is an equivalent circuit diagram when the second switching element Q2 is in the on state.

Figure 3C:
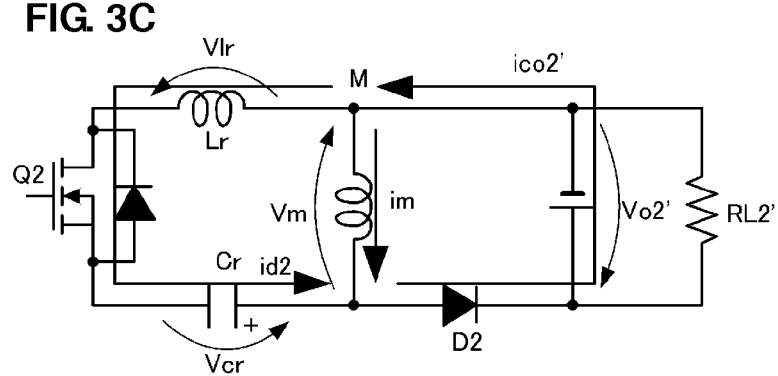
FIG. 3C is an equivalent circuit diagram when a second switching element Q2 is in the on state.

In FIG. 3A, FIG. 3B, and FIG. 3C, an inductor M equivalently represents a mutual inductance generated by the primary winding L1 and the secondary windings L21 and L22 in the transformer T1. Capacitors Co1' and Co2' correspond to the capacitors Co1 and Co2 shown in FIG. 2. Loads RL1' and RL2' correspond to the loads RL1 and RL2 shown in FIG. 2. Currents ico1' and ico2' correspond to the currents flowing through the capacitors Co1 and Co2 shown in FIG. 2. However, the values of the capacitors Co1' and Co2', the loads RL1' and RL2', and the currents ico1' and ico2' depend on the winding ratio between the primary winding and the secondary windings in the transformer T1, as represented by the following equations:

Formula 1

$$C_{o1}' = n_1^2 C_{o1}$$

$$R_{L1}' = n_1^2 R_{L1}$$

$$i_{co1}' = i_{co1}/n_1^2 \tag{1}$$

Formula 2

$$C_{o2}' = n_2^2 C_{o2}$$

$$R_{L2}' = n_2^2 R_{L2}$$

$$i_{co2}' = i_{co2}/n_2^2 \tag{2}$$

In Formulas 1 and 2, $C_{o1}'$ and $C_{o2}'$ denote the capacitance values of the capacitors Co1' and Co2', $R_{L1}'$ and $R_{L2}'$ denote the resistance values of the loads RL1' and RL2', and $i_{co1}'$ and $i_{co2}'$ denote the current values of the currents ico1' and ico2'.

Provided that the number of turns of the primary winding L1 in the transformer T1 is denoted by N1, the number of turns of the first secondary winding L21 therein is denoted by N21, and the number of turns of the second secondary winding L22 therein is denoted by N22, the following equations are established:

$$n1 = N1/N21$$

$$n2 = N1/N22$$

Turning on of the first switching element Q1 causes the input voltage Vi to be applied to the resonant circuit to cause a current to flow in a manner shown in FIG. 3B so as to charge Cr. Turning on of the second switching element Q2 causes a current to flow in a manner shown in FIG. 3C so that the charge accumulated in Cr is discharged.

Provided that the voltage between both ends of the inductor Lr is denoted by $V_{lr}$, the voltage to be applied to the load RL1' is denoted by $V_{o1}'$, the voltage between both ends of the capacitor Cr is denoted by $V_{cr}$, the current flowing through the diode D1 is denoted by $i_{d1}$, the voltage between both ends of the inductor M is denoted by $V_m$, and the current flowing through the inductor M is denoted by $i_m$, the following equations are established for the on period of the first switching element Q1:

Formula 3

$$V_i v_{lr} + v_m + v_{cr} \tag{3}$$

$$v_{lr} = L_r \frac{di_{d1}}{dt}$$

$$v_{cr} = \frac{1}{C_r} \int i_{d1} dt$$

$$v_m = M \frac{di_m}{dt} = \begin{cases} V_{o1}' & \left(M \frac{di_{d1}}{dt} > V_{o1}'\right) \\ M \frac{di_{d1}}{dt} & \left(M \frac{di_{d1}}{dt} \leq V_{o1}'\right) \end{cases}$$

$$i_{co1}' = i_{d1}' - i_m$$

Similarly, the following equations are established for the on period of the second switching element Q2:

Formula 4

$$0 = v_{lr} - V'_{o2} + v_{cr} \quad (4)$$

$$v_{lr} = -L_r \frac{di_{d1}}{dt}$$

$$v_{cr} = -\frac{1}{C_r} \int i_{d1} dt$$

$$v_m = M \frac{di_m}{dt} = \begin{cases} -V'_{o2} & \left(M \frac{di_{d2}}{dt} < -V'_{o2}\right) \\ M \frac{di_{d2}}{dt} & \left(M \frac{di_{d2}}{dt} \geq -V'_{o2}\right) \end{cases}$$

$$i'_{co2} = i'_{d2} + i_m$$

As described above, during the on period of the first switching element Q1, the power is supplied to the load RL1' and the power to be supplied to the load RL2' is charged in the capacitor Cr. The energy accumulated in the capacitor Cr is supplied to the load RL2' and the charge in the capacitor Cr is discharged during the on period of the second switching element Q2 to allow a larger power to be supplied from the input power supply to the resonant circuit during the on period of the first switching element Q1. The on period of the first switching element Q1 and the on period of the second switching element Q2 are subjected to the feedback control in the above manner to control the current resonant state so as to separately control $V_{o1}'$ (=Vo1) and $V_{o2}'$ (=Vo2).

This control system is a multivariable feedback control system in which two amounts of control and two amounts of operation have mutual interference and is capable of being controlled by a controller including the following transfer function matrix:

Formula 5

$$L\left[\begin{pmatrix} T_{on1} \\ T_{on2} \end{pmatrix}\right] = \begin{pmatrix} A & B \\ C & D \end{pmatrix} L\left[\begin{pmatrix} V_{ref1} - V_{o1} \\ V_{ref2} - V_{o2} \end{pmatrix}\right] \quad (5)$$

In Formula 5, L[] denotes a Laplace transform, $T_{on1}$ denotes the on time of the first switching element Q1, and $T_{on2}$ denotes the on time of the second switching element Q2. A, B, C, and D denote coefficients defined by the circuit and the operation state. $V_{ref1}$ and $V_{ref2}$ denote reference voltages.

In proportional-integral (PI) control of $T_{on1}$ on the basis of Vo2 and the PI control of $T_{on2}$ on the basis of Vo1, the coefficients A, B, C, and D shown in Formula 5 are as follows:

Formula 6

$$A = 0 \quad (6)$$
$$B = \frac{K_{IB}}{s} + K_{PB}$$
$$C = \frac{K_{IC}}{s} + K_{PC}$$
$$D = 0$$

In Formula 6, $K_{IB}/s$ and $K_{IC}/S$ denote integral control and $K_{PB}$ and $K_{PC}$ denote proportional control.

Since A=D=0 in this example, it is easy to perform the control. Specifically, although it is difficult to realize the control by using the analog circuit if the coefficients A and D are also non-zero because the multivariable control is performed, it is relatively easy to realize the control by using the analog circuit if A=D=0.

How to generate drive pulses of the first switching element Q1 and the second switching element Q2 with $T_{on1}$ and $T_{on2}$ that are specified when the control circuit 10 includes a digital signal processor (DSP) will now be described with reference to FIG. 4. How to set a digital pulse width modulation (PWM) module and an operation of the digital PWM module are described with reference to FIG. 4.

Figure 4:
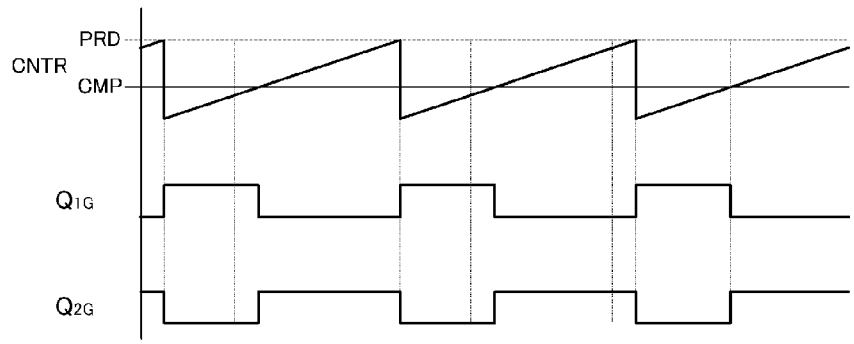
FIG. 4 is a diagram showing how to generate drive pulses of the first switching element Q1 and the second switching element Q2.

Referring to FIG. 4, CNTR denotes a counter and is incremented for every clock signal. PRD denotes a period and becomes zero when CNTR reaches the value of PRD. In other words, PRD determines a switching period. CMP denotes a comparator and the pulses are inverted if CNTR coincides with CMP.

Q1G denotes a Q1 drive pulse. The Q1 drive pulse Q1G is set so as to rise if CNTR is equal to zero and so as to fall if CNTR coincides with CMP. Q2G denotes a Q2 drive pulse. The Q2 drive pulse Q2G is set so as to rise if CNTR coincides with CMP and so as to fall if CNTR coincides with PRD. The drive pulses of Q1 and Q2 are generated so that PRD corresponds to $T_{on1}+T_{on2}$ and CMP corresponds to $T_{on1}$.

The control circuit 10 shown in FIG. 2 includes a first output voltage detection circuit that detects the first output voltage Vo1 and a second output voltage detection circuit that detects the second output voltage Vo2. The control circuit 10 in FIG. 2 performs the feedback control to the on time $T_{on1}$ of the first switching element Q1 and the on time $T_{on2}$ of the second switching element Q2 so that the first output voltage Vo1 and the second output voltage Vo2 are equal to certain values on the basis of the detection signal by the first output voltage detection circuit and the detection signal by the second output voltage detection circuit.

As described above, the capacitor Cr is charged during the on period of the first switching element Q1 and the energy accumulated in the capacitor Cr is supplied to the load during the on period of the second switching element Q2. With this effect, the second output voltage Vo2 is capable of being controlled in the on time of the first switching element Q1. Similarly, the first output voltage Vo1 is capable of being controlled in the on time of the second switching element Q2.

Second Preferred Embodiment

Figure 5:
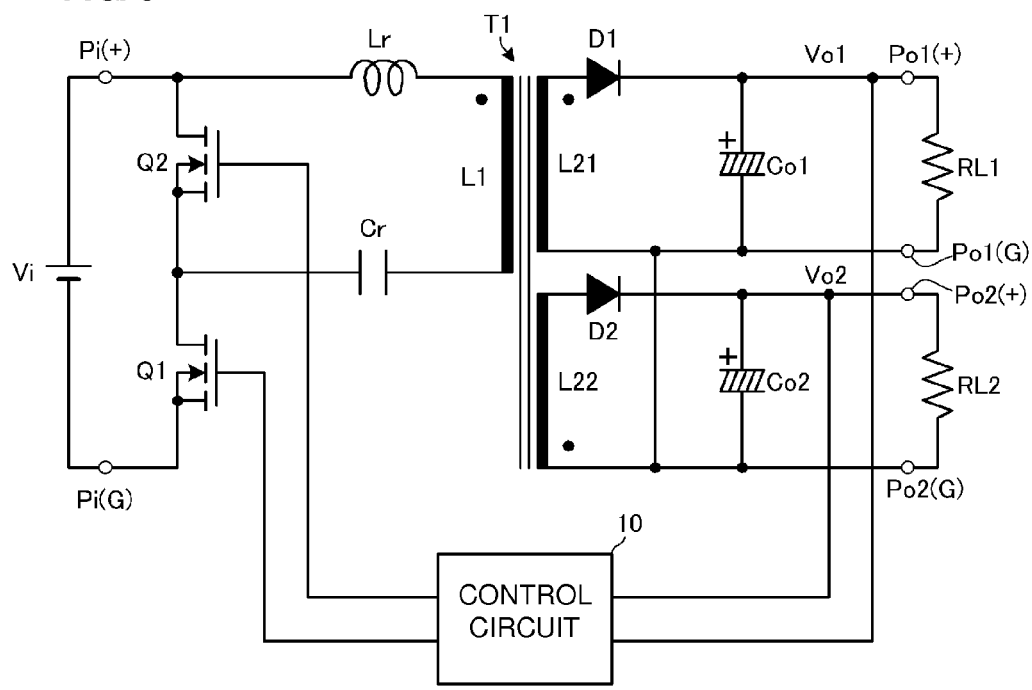
FIG. 5 is a circuit diagram of a switching power supply apparatus 102 according to a second preferred embodiment of the present invention.

FIG. 5 is a circuit diagram of a switching power supply apparatus 102 according to a second preferred embodiment. The circuit of the switching power supply apparatus 102 differs from the circuit in the first preferred embodiment shown in FIG. 2 in the configuration of a primary side of the transformer T1. In the example in FIG. 5, the first switching element Q1 is provided at a low side and the second switching element Q2 is provided at a high side. The circuit operation of the switching power supply apparatus 102 is preferably the same as that of the switching power supply apparatus 101 shown in FIG. 2.

Third Preferred Embodiment

Figure 6:
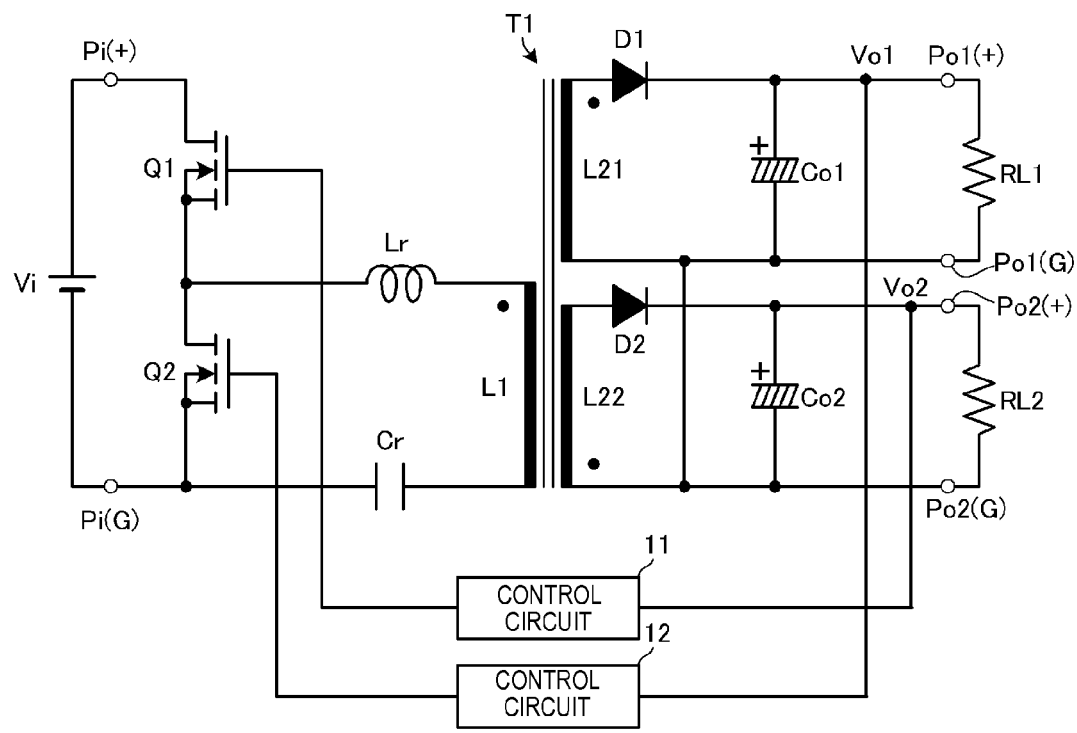
FIG. 6 is a circuit diagram of a switching power supply apparatus 103 according to a third preferred embodiment of the present invention.

FIG. 6 is a circuit diagram of a switching power supply apparatus 103 according to a third preferred embodiment. The circuit of the switching power supply apparatus 103 differs from the circuit in the first preferred embodiment shown in FIG. 2 in the configuration of control circuits 11 and 12. The operation of the converter is preferably the same as that in the switching power supply apparatus 101 shown in FIG. 2.

In the example in FIG. 6, the control circuit 11 that detects the second output voltage Vo2 to control the on time of the first switching element Q1 and the control circuit 12 that detects the first output voltage Vo1 to control the on time of the second switching element Q2 are separately provided.

Figure 7:
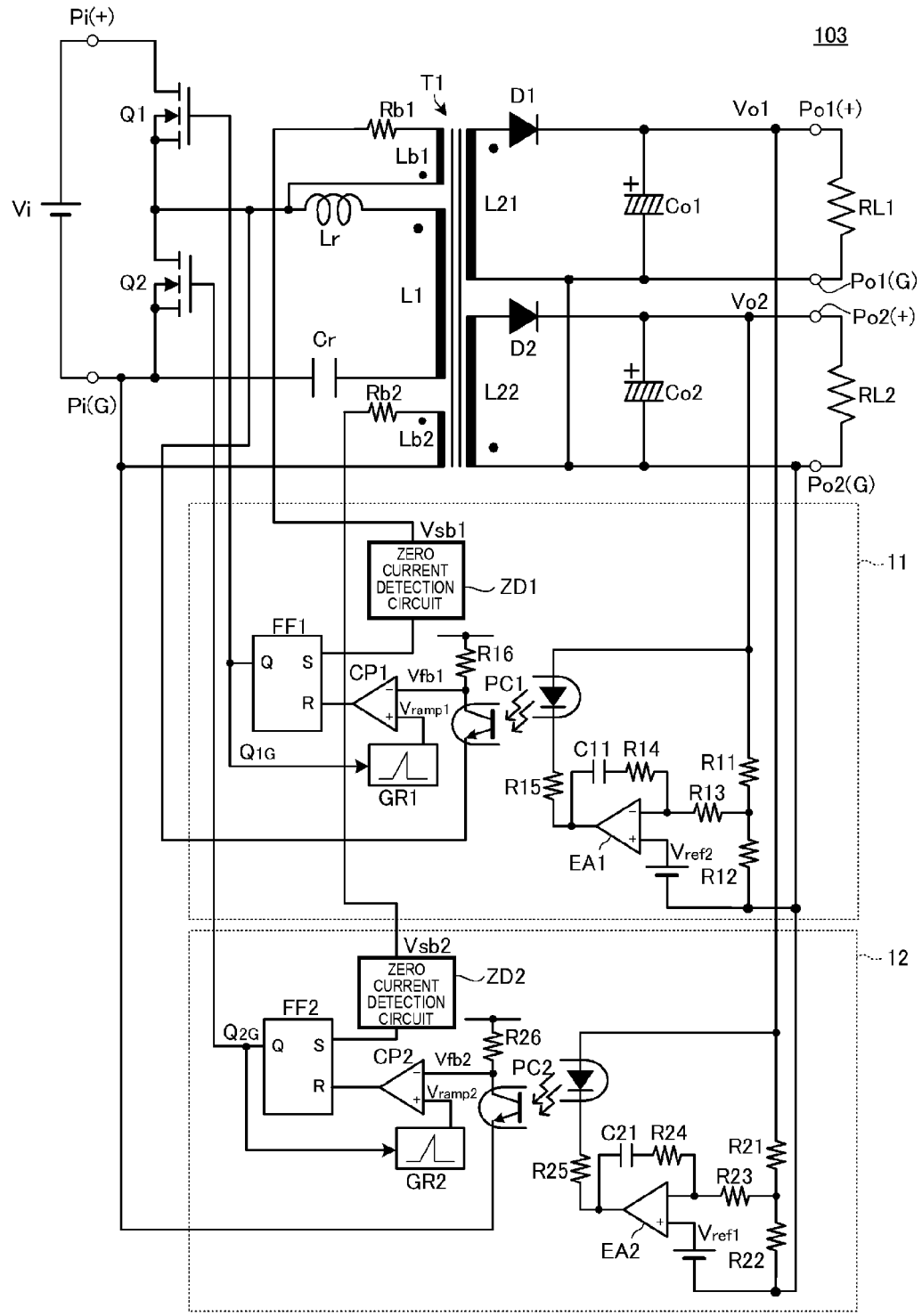
FIG. 7 is an exemplary specific circuit diagram of control circuits 11 and 12 shown in FIG. 6.

FIG. 7 is an exemplary specific circuit diagram of the control circuits 11 and 12 shown in FIG. 6. The control circuit 11 preferably has the same configuration as that of the control circuit 12. The control circuit 11 will now be described here. A resistive potential divider circuit including resistors R11 and R12 is connected between the second power output terminals Po2(+) and Po2(G). An error amplifier EA1, resistors R13 and R14, a capacitor C11, and a reference voltage generating circuit Vref2 define an error amplifier circuit. The output voltage from the resistive potential divider circuit is supplied to the error amplifier circuit through the resistor R13. A light emitting element of a photocoupler PC1 is connected to the output from the error amplifier circuit via a resistor R15. A resistor R16 is connected to a light receiving element of the photocoupler PC1 to define a light receiving circuit. A feedback voltage Vfb1 is output from the light receiving circuit. The feedback voltage Vfb1 is input into a − input terminal of a comparator CP1 and the output signal from a ramp waveform generating circuit GR1 is input into a + input terminal thereof. The ramp waveform generating circuit GR1 generates a ramp waveform in response to a set output signal from a flip flop FF1, which serves as a trigger.

An auxiliary winding Lb1 is provided in the transformer T1 and a zero current detection circuit ZD1 is connected to the auxiliary winding Lb1 via a resistor Rb1. The zero current detection circuit ZD1 detects inversion timing of the voltage of the transformer on the basis of a voltage Vsb1 of the auxiliary winding Lb1 in the transformer T1.

The flip flop FF1 is set in response to an output from the zero current detection circuit ZD1 and is reset in response to an output from the comparator CP1. A Q output from the flip flop FF1 is supplied as a gate signal for the first switching element Q1.

As shown in FIG. 7, the configuration of the control circuit 12 is the same as that of the control circuit 11.

FIG. 8 is a waveform diagram of signals output from the components in the circuit shown in FIG. 7. At a timing t1, turning off of the second switching element Q2 is detected by a decrease of the auxiliary winding voltage Vsb1 and the flip flop FF1 is set. The first switching element Q1 is turned on in response to a Q output signal $Q_{1G}$ from the flip flop FF1. Simultaneously with the turning on of the first switching element Q1, an increase of Vramp1 is started. At a timing t2 when Vramp1 reaches Vfb1, the flip flop FF1 is reset and the first switching element Q1 is turned off. As a result, a resonant voltage appears at an auxiliary winding Lb2 due to a parasitic component of, for example, the switching element to decrease an auxiliary winding voltage Vsb2.

At a timing t3 when the turning off of the first switching element Q1 is detected by the auxiliary winding voltage Vsb2, a flip flop FF2 is set. The second switching element Q2 is turned on in response to a Q output signal $Q_{2G}$ from the flip flop FF2. At a timing t4 when Vramp2 reaches Vfb2, the flip flop FF2 is reset and the second switching element Q2 is turned off. As a result, a resonant voltage appears at the auxiliary winding Lb1 due to a parasitic component to decrease the auxiliary winding voltage Vsb1.

The above operation is repeated.

Although the downstream portion of the light receiving circuit in each of the control circuits 10 and 11 is represented by using the analog circuit in FIG. 7, the main portion of each of the control circuits 10 and 11 may include a digital signal processor (DSP). In this case, the ramp waveform generating circuits GR1 and GR2 each include a counter, the comparators CP1 and CP2 each include a digital comparator, and the flip flops FF1 and FF2 each include a digital output port.

Fourth Preferred Embodiment

Figure 9A:
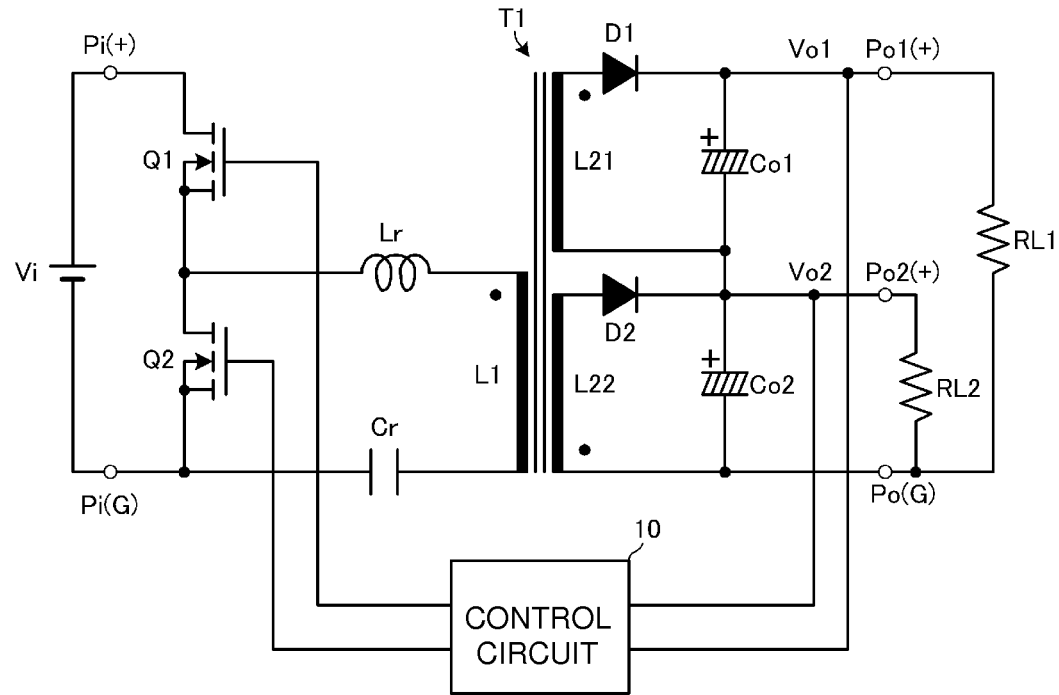
FIG. 9A is a circuit diagram of a switching power supply apparatus 104A according to a fourth preferred embodiment and FIG. 9B is a circuit diagram of a switching power supply apparatus 104B according to the fourth preferred embodiment of the present invention.
Figure 9B:
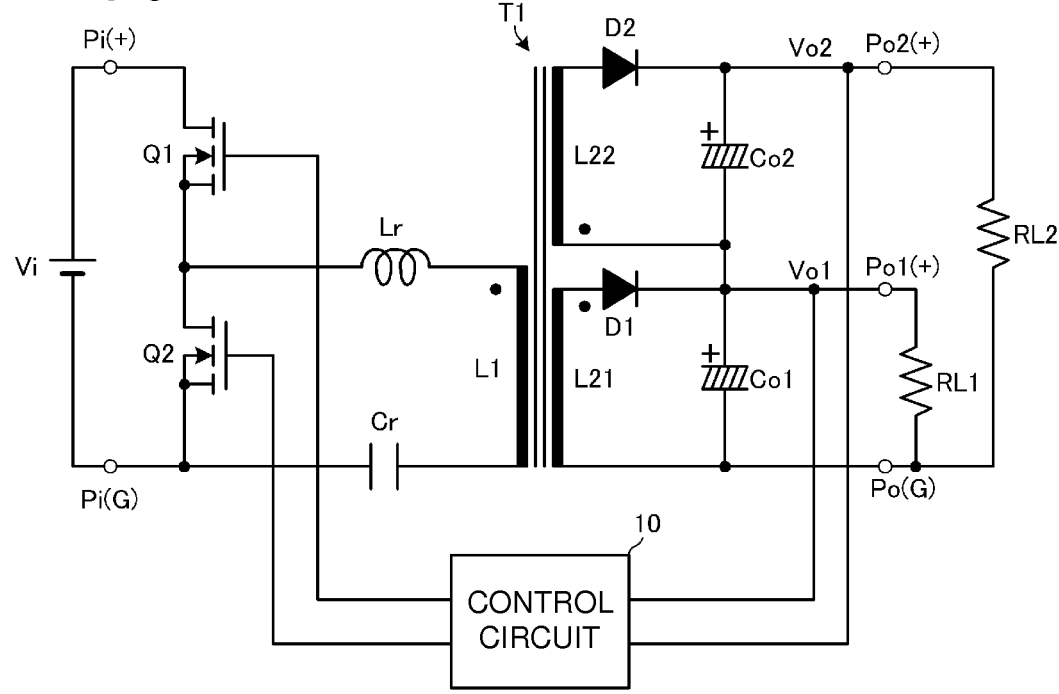

FIG. 9A is a circuit diagram of a switching power supply apparatus 104A according to a fourth preferred embodiment and FIG. 9B is a circuit diagram of a switching power supply apparatus 104B according to the fourth preferred embodiment. The switching power supply apparatuses 104A and 104B differ from the circuit in the first preferred embodiment shown in FIG. 2 in the configuration of a secondary side of the transformer T1. The operation of the converter is the same as that in the switching power supply apparatus 101 shown in FIG. 2.

In the examples in FIG. 9A and FIG. 9B, the first secondary winding L21 and the second secondary winding L22 are separately wound and the ground side of the first rectifier smoothing circuit is connected to the voltage output side of the second rectifier smoothing circuit.

With this configuration, it is possible to adjust the power sharing between the first secondary winding L21 and the second secondary winding L22. For example, if outputs of Vo1=12 [V], 100 [W] (8.3 A) and Vo2=5 [V], 30 [W] (6 A) are required, it is sufficient for the first secondary winding L21 to produce an output of 7 [V], 58.1 [W] (7×8.3=58.1) and it is sufficient for the second secondary winding L22 to produce an output of 5 [V], 71.5 [W] (5×(8.3+6)=71.5), for example.

In order to achieve similar specifications with the switching power supply apparatus 101 in the first preferred embodiment, the power sharing between the first secondary winding L21 and the second secondary winding L22 is made unbalanced. For example, the first secondary winding L21 produces an output of 12 [V], 100 [W] (8.3 A) and the second secondary winding L22 produces an output of 5 [V], 30 [W] (6 A), for example. As described above, according to the fourth preferred embodiment, the on-off operation of the two switching elements Q1 and Q2 at the primary side becomes close to a symmetric operation, the loss is evenly distributed, and the current effective value is suppressed, thereby improving the efficiency.

In the switching power supply apparatus 104B in FIG. 9B, the ground side of the second rectifier smoothing circuit is connected to the voltage output side of the first rectifier smoothing circuit. This configuration can be considered as a configuration in which the polarity of the secondary windings relative to the primary winding in the transformer T1 is reversed with respect to that in FIG. 9A. The operational effect of the switching power supply apparatus 104B is the same as that of the switching power supply apparatus 104A.

Fifth Preferred Embodiment

Although the transformer including the two secondary windings preferably is used in the preferred embodiments described above, a single secondary winding preferably is used to produce two output voltages in a fifth preferred embodiment. FIGS. 10 to 13 are exemplary circuit diagrams at the secondary side of four switching power supply apparatuses according to the fifth preferred embodiment. The switching power supply apparatuses according to the fifth preferred embodiment may adopt the configuration of the primary side of any of the circuits in the above preferred embodiments.

Figure 10:
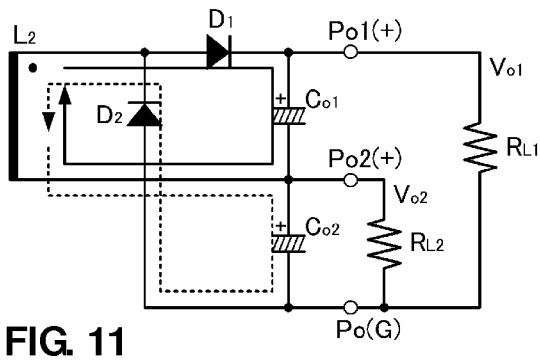
FIG. 10 is a circuit diagram at a secondary side of a switching power supply apparatus according to a fifth preferred embodiment of the present invention.

In the example in FIG. 10, a voltage-doubler rectifier circuit including the diodes D1 and D2 and the capacitors Co1 and Co2 is configured for a secondary winding L2 in the transformer. During a period in which a positive voltage occurs at a side indicated by a dot mark of the secondary winding L2, the capacitor Co1 is charged through a path indicated by a solid-line arrow in FIG. 10. During a period in which a negative voltage occurs at the side indicated by the dot mark of the secondary winding, the capacitor Co2 is charged through a path indicated by a dotted-line arrow in FIG. 10. The voltage resulting from addition of the charge voltage of the capacitor Co1 to the charge voltage of the capacitor Co2 is supplied to the first power output terminal Po1(+). The charge voltage of the capacitor Co2 is supplied to the second power output terminal Po2(+).

Figure 11:
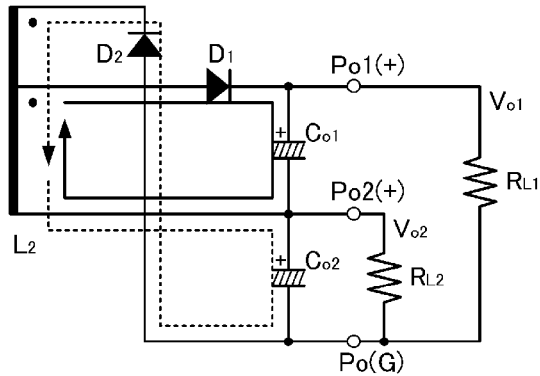
FIG. 11 is a circuit diagram at the secondary side of another switching power supply apparatus according to the fifth preferred embodiment of the present invention.

In the example in FIG. 11, the voltage-doubler rectifier circuit including the diodes D1 and D2 and the capacitors Co1 and Co2 is configured for the secondary winding L2 in the transformer. However, unlike the example in FIG. 10, a winding is added to the secondary winding L2 and the diode D2 is connected to the added winding. Accordingly, it is possible to make the charge voltage of the capacitor Co2 higher than the charge voltage of the capacitor Co1. With such a configuration, the ratio between the first output voltage Vo1 and the second output voltage Vo2 can be largely shifted from 2:1. Although the example in which the voltage is increased by the addition of the winding is shown in FIG. 11, the voltage may be decreased by extending a tap in the secondary winding L2.

Figure 12:
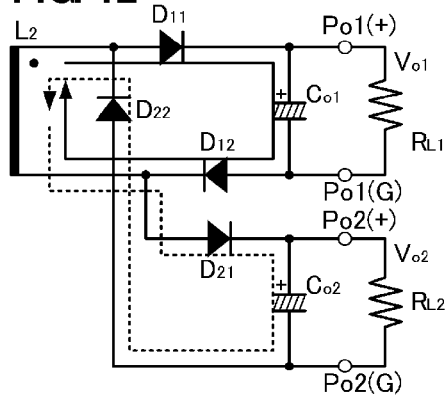
FIG. 12 is a circuit diagram at the secondary side of another switching power supply apparatus according to the fifth preferred embodiment of the present invention.

In the example in FIG. 12, a rectifier smoothing circuit including diodes D11 and D12 and the capacitor Co1 and a rectifier smoothing circuit including diodes D21 and D22 and the capacitor Co2 are connected to the secondary winding L2. During a period in which a positive voltage occurs at a side indicated by a dot mark of the secondary winding L2, the capacitor Co1 is charged through a path indicated by a solid-line arrow in FIG. 12. During a period in which a negative voltage occurs at the side indicated by the dot mark of the secondary winding L2, the capacitor Co2 is charged through a path indicated by a dotted-line arrow in FIG. 12.

Figure 13:
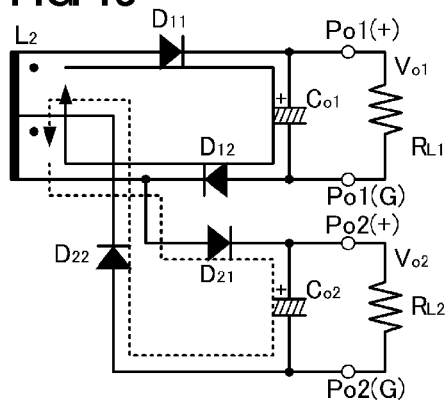
FIG. 13 is a circuit diagram at the secondary side of another switching power supply apparatus according to the fifth preferred embodiment of the present invention.

In the example in FIG. 13, the rectifier smoothing circuit including the diodes D11 and D12 and the capacitor Co1 and the rectifier smoothing circuit including the diodes D21 and D22 and the capacitor Co2 are connected to the secondary winding L2. However, unlike the example in FIG. 12, a tap is extended in the secondary winding L2 and the diode D22 is connected to the extended winding. Accordingly, it is possible to make the charge voltage of the capacitor Co2 lower than the charge voltage of the capacitor Co1. With such a configuration, the ratio between the first output voltage Vo1 and the second output voltage Vo2 can be largely shifted from 1:1. Although the example in which the voltage is decreased by extending the tap in the secondary winding L2 is shown in FIG. 13, the voltage may be increased by the addition of a winding.

Sixth Preferred Embodiment

Figure 14:
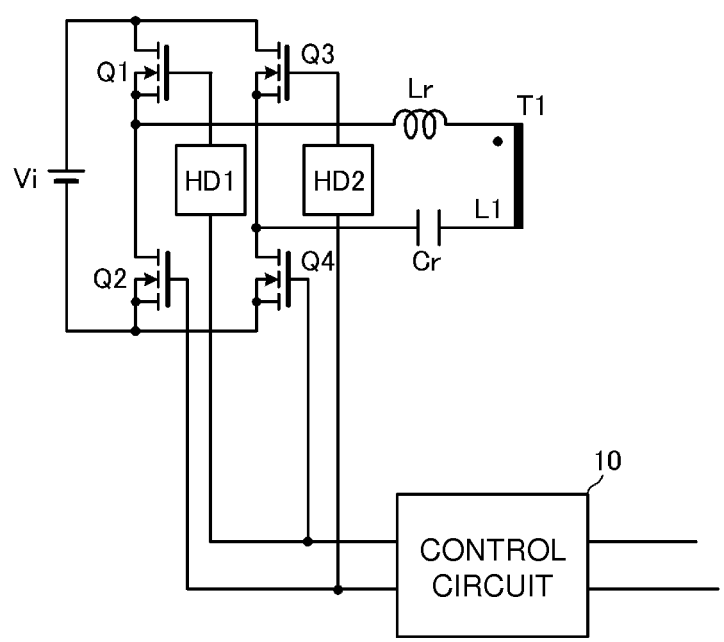
FIG. 14 is a circuit diagram at a primary side of a switching power supply apparatus according to a sixth preferred embodiment of the present invention.

Although the two switching elements are preferably provided at the primary side of the transformer in the preferred embodiments described above, four switching elements are preferably used in a sixth preferred embodiment. FIG. 14 is a circuit diagram at the primary side of a switching power supply apparatus according to the sixth preferred embodiment. The switching power supply apparatus according to the sixth preferred embodiment may adopt the configuration of the secondary side of any of the circuits in the above preferred embodiments.

A first series circuit in which the first switching element Q1 is at a high side and the second switching element Q2 is at a low side and a second series circuit in which a third switching element Q3 is at the high side and a fourth switching element Q4 is at the low side are connected to the power receiving unit. High-side driver circuits HD1 and HD2 are connected to the high-side switching elements Q1 and Q3, respectively. The control circuit 10 simultaneously turns on or off the switching elements Q1 and Q4 and simultaneously turns on or off the switching elements Q2 and Q3.

A bridge circuit may be configured at the primary side in the above manner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply apparatus comprising:
a series circuit that is connected to a power receiving unit into which a direct current input voltage is input and that includes a first switching element and a second switching element;
a transformer in which at least a primary winding and a secondary winding are magnetically coupled to each other;
a series resonant circuit connected in parallel to the first switching element or the second switching element, in which the primary winding in the transformer, an inductor, and a capacitor are connected in series to each other;
a first rectifier smoothing circuit that rectifies and smoothes a voltage occurring at the secondary winding in the transformer during an on period of the first switching element to extract a first output voltage;
a second rectifier smoothing circuit that rectifies and smoothes a voltage occurring at the secondary winding in the transformer during an on period of the second switching element to extract a second output voltage;
a switching control circuit that drives the first switching element and the second switching element so that the first switching element and the second switching element complementarily repeat turning on-off, controls an on time of the first switching element and an on time of the second switching element based on the first output voltage and the second output voltage, respectively, and controls the first output voltage and the second output voltage;
a first output voltage detection circuit that detects the first output voltage; and
a second output voltage detection circuit that detects the second output voltage; wherein
during the on period of the first switching element, a first power is supplied to the first rectifier smoothing circuit and a second power to be supplied to the second rectifier smoothing circuit is charged in the capacitor of the series resonant circuit;
during the on period of the second switching element, the second power charged in the capacitor of the series resonant circuit is discharged and supplied to the second rectifier smoothing circuit; and
the switching control circuit performs multivariable feedback control to the on time of the first switching element and the on time of the second switching element so that the first output voltage and the second output voltage are equal to certain voltage values based on a detection signal detected by the first output voltage detection circuit and a detection signal detected by the second output voltage detection circuit in the following relationship:

Formula 5

$$L\left[\begin{pmatrix} T_{on1} \\ T_{on2} \end{pmatrix}\right] = \begin{pmatrix} A & B \\ C & D \end{pmatrix} L\left[\begin{pmatrix} V_{ref1} - V_{o1} \\ V_{ref2} - V_{o2} \end{pmatrix}\right] \quad (5)$$

where, in Formula 5, A, B, C, and D denote transfer functions and L[] denotes a Laplace transform, $V_{o1}$ denotes the first output voltage, $V_{o2}$ denotes the second output voltage, $T_{on1}$ denotes the on time of the first switching element, $T_{on2}$ denotes the on time of the second switching element, $V_{ref1}$ denotes a first reference voltage, and $V_{ref2}$ denotes a second reference voltage.

2. The switching power supply apparatus according to claim 1, wherein the transfer function A and the transfer function D are set to zero.

3. The switching power supply apparatus according to claim 1, wherein the secondary winding includes a single winding that generates the first output voltage and the second output voltage.

4. The switching power supply apparatus according to claim 1, wherein the secondary winding includes a first secondary winding that generates the first output voltage and a second secondary winding that generates the second output voltage.

5. The switching power supply apparatus according to claim 4, wherein the first secondary winding and the second secondary winding are separately wound and a ground side of the first rectifier smoothing circuit is connected to the ground side of the second rectifier smoothing circuit.

6. The switching power supply apparatus according to claim 4, wherein the first secondary winding and the second secondary winding are separately wound and a ground side of the first rectifier smoothing circuit is connected to a voltage output side of the second rectifier smoothing circuit or the ground side of the second rectifier smoothing circuit is connected to the voltage output side of the first rectifier smoothing circuit.

7. The switching power supply apparatus according to claim 1, wherein the switching control circuit includes a digital signal processor.

8. A switching power supply apparatus comprising:
a first series circuit that is connected to a power receiving unit into which a direct current input voltage is input and in which a first switching element is at a high side and a second switching element is at a low side;
a second series circuit that is connected to the power receiving unit into which the direct current input voltage is input and in which a third switching element is at the high side and a fourth switching element is at the low side;
a transformer in which at least a primary winding and a secondary winding are magnetically coupled to each other;
a series resonant circuit one end of which is connected to a connection point between the first switching element and the second switching element and the other end of which is connected to a connection point between the third switching element and the fourth switching element, the series resonant circuit including the primary winding in the transformer, an inductor, and a capacitor;
a first rectifier smoothing circuit that rectifies and smoothes a voltage occurring at the secondary winding in the transformer during an on period of the first switching element and the fourth switching element to extract a first output voltage;
a second rectifier smoothing circuit that rectifies and smoothes a voltage occurring at the secondary winding in the transformer during an on period of the second switching element and the third switching element to extract a second output voltage;
a switching control circuit that drives the first switching element, the second switching element, the third switching element, and the fourth switching element so that the first and fourth switching elements and the second and third switching elements complementarily repeat turning on-off, controls an on time of the first switching element and the fourth switching element and an on time of the second switching element and the third switching element on the basis of the first output voltage and the second output voltage, respectively, and controls the first output voltage and the second output voltage;
a first output voltage detection circuit that detects the first output voltage; and
a second output voltage detection circuit that detects the second output voltage; wherein
during the on period of the first switching element, a first power is supplied to the first rectifier smoothing circuit and a second power to be supplied to the second rectifier smoothing circuit is charged in the capacitor of the series resonant circuit;
during the on period of the second switching element, the second power charged in the capacitor of the series resonant circuit is discharged and supplied to the second rectifier smoothing circuit; and
the switching control circuit performs multivariable feedback control to the on time of the first switching element and the on time of the second switching element so that the first output voltage and the second output voltage are equal to certain voltage values based on a detection signal detected by the first output voltage detection circuit and a detection signal detected by the second output voltage detection circuit in the following relationship:

Formula 5

$$L\left[\begin{pmatrix} T_{on1} \\ T_{on2} \end{pmatrix}\right] = \begin{pmatrix} A & B \\ C & D \end{pmatrix} L\left[\begin{pmatrix} V_{ref1} - V_{o1} \\ V_{ref2} - V_{o2} \end{pmatrix}\right] \quad (5)$$

where, in Formula 5, A, B, C, and D denote transfer functions and L[] denotes a Laplace transform, $V_{o1}$ denotes the first output voltage, $V_{o2}$ denotes the second output voltage, $T_{on1}$ denotes the on time of the first switching element, $T_{on2}$ denotes the on time of the second switching element, $V_{ref1}$ denotes a first reference voltage, and $V_{ref2}$ denotes a second reference voltage.

9. The switching power supply apparatus according to claim 8, wherein the transfer function A and the transfer function D are set to zero.

10. The switching power supply apparatus according to claim 8, wherein the secondary winding includes a single winding that generates the first output voltage and the second output voltage.

11. The switching power supply apparatus according to claim 8, wherein the secondary winding includes a first secondary winding that generates the first output voltage and a second secondary winding that generates the second output voltage.

12. The switching power supply apparatus according to claim 11, wherein the first secondary winding and the second secondary winding are separately wound and a ground side of the first rectifier smoothing circuit is connected to the ground side of the second rectifier smoothing circuit.

13. The switching power supply apparatus according to claim 11, wherein the first secondary winding and the second secondary winding are separately wound and a ground side of the first rectifier smoothing circuit is connected to a voltage output side of the second rectifier smoothing circuit or the ground side of the second rectifier smoothing circuit is connected to the voltage output side of the first rectifier smoothing circuit.

14. The switching power supply apparatus according to claim 8, wherein the switching control circuit includes a digital signal processor.

* * * * *